(No Model.)
C. H. DOUGLAS.
DRIVING BELT.
No. 441,359. Patented Nov. 25, 1890.
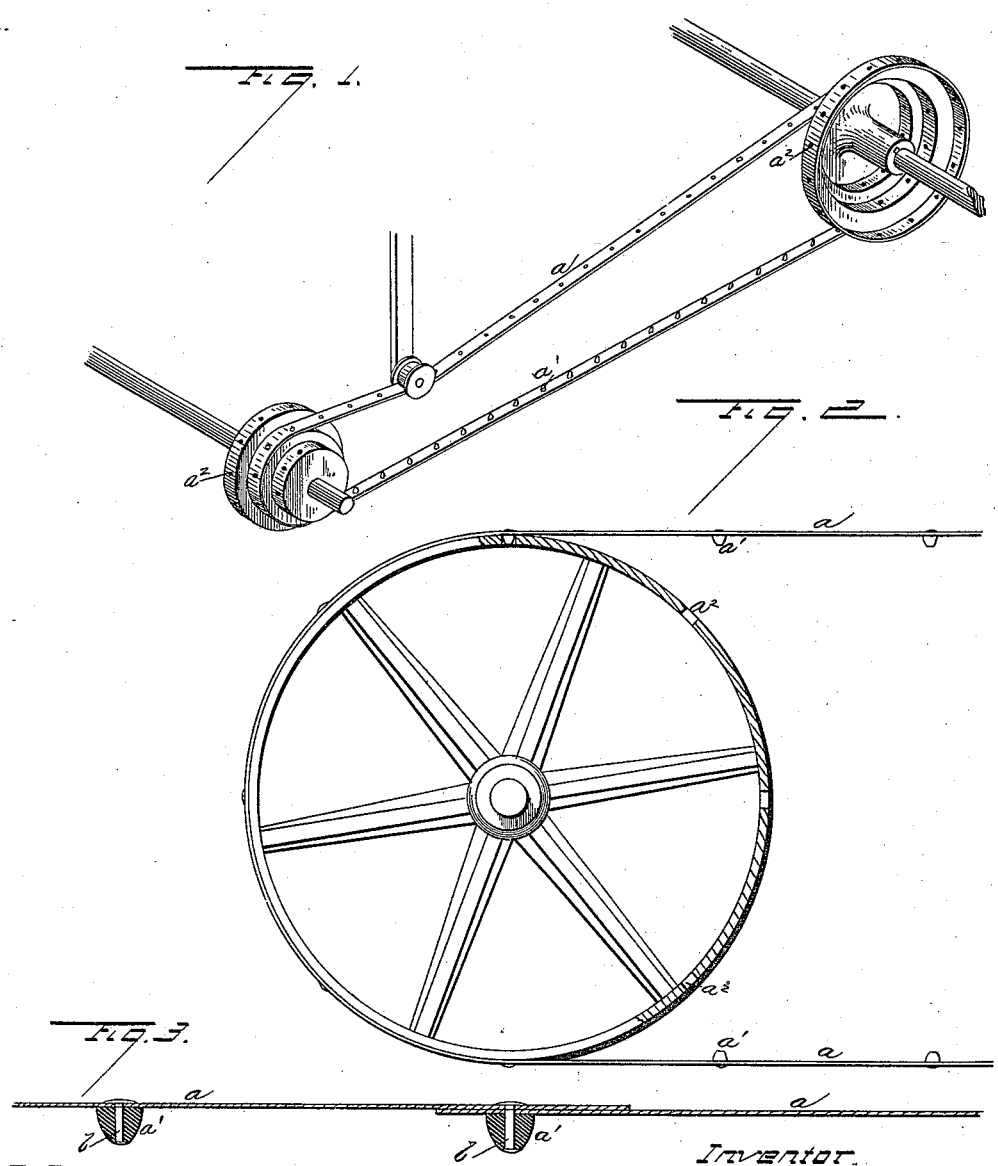
Witnesses.
Inventor.
Charles H. Douglas

UNITED STATES PATENT OFFICE.

CHARLES H. DOUGLAS, OF CHICAGO, ILLINOIS, ASSIGNOR OF PART TO MARQUIS F. SEELY, OF FREMONT, NEBRASKA, AND DAYTON, POOLE & BROWN, OF CHICAGO, ILLINOIS.

DRIVING-BELT.

SPECIFICATION forming part of Letters Patent No. 441,359, dated November 25, 1890.

Application filed May 11, 1888. Serial No. 273,549. (No model.)

*To all whom it may concern:*

Be it known that I, CHARLES H. DOUGLAS, a citizen of the United States, residing at Chicago, in the county of Cook and State of Illinois, have invented certain new and useful Improvements in Driving-Belts; and I do hereby declare that the following is a full, clear, and exact description thereof, reference being had to the accompanying drawings, and to the letters of reference marked thereon, which form a part of this specification.

This invention relates to an improvement in driving-belts; and it consists in the features of construction hereinafter more fully set forth and claimed.

In the accompanying drawings, illustrating my invention, Figure 1 is a perspective view of a driving-belt adapted for use upon cone-pulleys. Fig. 2 is a side view of the same applied to a flat pulley, and Fig. 3 is a longitudinal section of my belt.

In the said drawings, A represents a flat and thin strip or ribbon of resilient or spring metal—such as steel or cold-rolled brass—the ends of which are joined in a suitable manner to form a driving-belt.

In Fig. 1, A A' represent two cone-pulleys over which the belt is trained, and in Fig. 2 A² represents a single pulley of common form, which may be either a driving or driven pulley. This belt is provided with a series of projections or spurs $a'$ on its inner side, which engage a series of holes or sockets $a^2$ in the pulleys A A' A², over which the belt runs, to insure a certain and positive driving-connection without danger of slipping. The projections may be placed on the pulley and the sockets in the belt in some cases; but I prefer the construction illustrated as less liable to injure the belt by a sharp strain at any one point. To attach the projections to the belt, I prefer to form them as in Fig. 3, where the spurs or projections $a'$ are represented as formed of steel with a central hole, and secured in place by means of a small-headed rivet $b$, passed through the belt and spur and then headed down on the outer end of said spur, as at $b'$, this construction enabling the work to be rapidly done without danger of injury to the material of the belt. The belt so made of steel, brass, or other suitable metal is not only light and cheap, but possesses great strength, is much smaller than belts of leather for a given work, and is capable of very high speed without liability of stretching or any danger of slipping. In small and light machinery the belt is readily taken off or placed on the pulley by making one of the shafts adjustable in its bearings in any of the common and well-known ways, (not necessary to illustrate here,) while in heavier work the belt may be used with a slack, which is taken up by a movable idler, as shown at B in Fig. 1, and the movement of this idler readily gives sufficient play for running the belt on or off, as desired.

I do not desire to confine myself either to a belt made of any particular metal, provided the same is resilient, or to the mode herein described, for causing a positive engagement of the belt with the pulley, but desire to vary these as particular work and experience may require—as, for instance, the projections and rivets may be in one piece, the projections being formed with a small stud, which passes through the belt and is headed down or threaded and held by a nut. It may also be desirable to secure the spurs or projections $a'$ to the belt with screws passing through the belt and into the said spurs in place of rivets. They may also be secured to the belt by bolts and nuts.

Two or more rows of the spurs $a'$ may be used upon wide belts, and the said spurs may be present on both the outer and inner face of the belt.

By making the belt resilient, or, in other words, making it elastic or spring-like, as may be done by tempering a steel belt, not only is the stretching of the belt avoided, but it is prevented from bending or setting to the curvature of the pulley as it passes over it.

I claim as my invention—

The combination, with a driving-pulley, of a belt consisting of a thin strip or ribbon of resilient metal, one of said parts being provided with spurs or projections, and the other with holes or sockets to insure a positive engagement of the belt with the pulley, substantially as described.

In testimony whereof I affix my signature in presence of two witnesses.

CHARLES H. DOUGLAS.

Witnesses:
W. C. McArthur,
W. S. McArthur.